(12) United States Patent
Murphy et al.

(10) Patent No.: US 7,655,911 B2
(45) Date of Patent: Feb. 2, 2010

(54) IMAGE SENSOR HAVING A VARIABLE APERTURE AND MONO-COLOR FOCAL PLANE ARRAY FOR DUAL COLOR DETECTION

(75) Inventors: Terence Joseph Murphy, Plano, TX (US); Robert Duvall, Torrance, CA (US); Shirley Rae Duvall, legal representative, Torrance, CA (US)

(73) Assignee: DRS Sensors & Targeting Systems, Inc., Dallas, TX (US)

( * ) Notice: Subject to any disclaimer, the term of this patent is extended or adjusted under 35 U.S.C. 154(b) by 358 days.

(21) Appl. No.: 11/737,248

(22) Filed: Apr. 19, 2007

(65) Prior Publication Data

US 2009/0114820 A1    May 7, 2009

(51) Int. Cl.
    *G01J 5/00*    (2006.01)
(52) U.S. Cl. ....................................................... 250/352
(58) Field of Classification Search ................... 250/352
    See application file for complete search history.

(56) References Cited

U.S. PATENT DOCUMENTS 6,034,372 A * 3/2000 LeVan ......................... 250/352
7,157,706 B2 * 1/2007 Gat et al. .................. 250/338.1
7,297,951 B2 * 11/2007 Chen et al. ............. 250/339.02

* cited by examiner

*Primary Examiner*—Constantine Hannaher
(74) *Attorney, Agent, or Firm*—Sonnenschein Nath & Rosenthal LLP

(57) ABSTRACT

An image sensor is provided that includes a focal plane array; a cold shield having a top wall disposed over the focal plane array and defining an aperture operatively configured to be selectively switched between a first diameter and a second diameter that is larger than the first diameter; and a filter element disposed between the cold shield aperture and the focal plane array. The filter element includes a first band-pass filter and a second band-pass filter. The first band-pass filter is disposed directly beneath the cold shield aperture when the cold shield aperture is switched to the first diameter or the second diameter. The second band-pass filter is covered by the top wall of the cold shield when the cold shield aperture is switched to the first diameter and is disposed directly beneath the cold shield aperture when the cold shield aperture is switched to the second diameter.

10 Claims, 2 Drawing Sheets

IMAGE SENSOR HAVING A VARIABLE APERTURE AND MONO-COLOR FOCAL PLANE ARRAY FOR DUAL COLOR DETECTION

FIELD OF THE INVENTION

The present invention relates image sensors, more particularly, to an image sensor having a variable aperture and mono-color focal array for dual color detection.

BACKGROUND OF THE INVENTION

A conventional long wavelength infrared (LWIR) detector or image sensor may be used for detection of a target in battlefield conditions, where smoke or debris may otherwise inhibit detection of the target. However, when battlefield conditions do not inhibit detection of a target, a conventional medium wavelength infrared (MWIR) detector or image sensor may be used to provide better resolution capability than a LWIR detector or image sensor, especially for long range target identification. To achieve LWIR and MWIR detection capabilities, a dual band detector or image sensor is required.

A dual band detector may be achieved using a two-color focal plane array, rather than a mono-color focal plane array that is typically used in a conventional LWIR detector and in a conventional MWIR detector. A two-color focal plane array may be manufactured to detect both an LWIR signal and an MWIR signal. However, a two-color focal plane is more difficult and costly to manufacture than a mono-color focal plane array.

Accordingly, there is a need for a dual band detector or image sensor that overcomes the problems noted above and others previously experienced for detection of a target at long range and under battlefield conditions.

SUMMARY OF THE INVENTION

In accordance with systems and articles of manufacture consistent with the present invention, an image sensor is provided. The image sensor comprises a focal plane array; a cold shield having a top wall disposed over the focal plane array and defining an aperture operatively configured to be selectively switched between a first diameter and a second diameter that is larger than the first diameter; and a filter element disposed between the cold shield aperture and the focal plane array. The filter element includes a first band-pass filter and a second band-pass filter. The first band-pass filter is disposed directly beneath the cold shield aperture when the cold shield aperture is switched to the first diameter or the second diameter. The second band-pass filter is covered by the top wall of the cold shield when the cold shield aperture is switched to the first diameter and is disposed directly beneath the cold shield aperture when the cold shield aperture is switched to the second diameter.

In one implementation, the first band-pass filter is adapted to pass to the focal plane array a first signal having a first wavelength within a first band of wavelengths and the second band-pass filter is adapted to pass to the focal plane array a second signal having a second wavelength within a second band of wavelengths, where the second band of wavelengths is different than the first band of wavelengths. In this implementation, the focal plane array is a mono-color focal plane array having a plurality of pixels, each of which is adapted to detect the first signal passed by the first band-pass filter and the second signal passed by the second band-pass filter.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Reference will now be made in detail to an implementation in accordance with methods, systems, and products consistent with the present invention as illustrated in the accompanying drawings.

Figure 1:
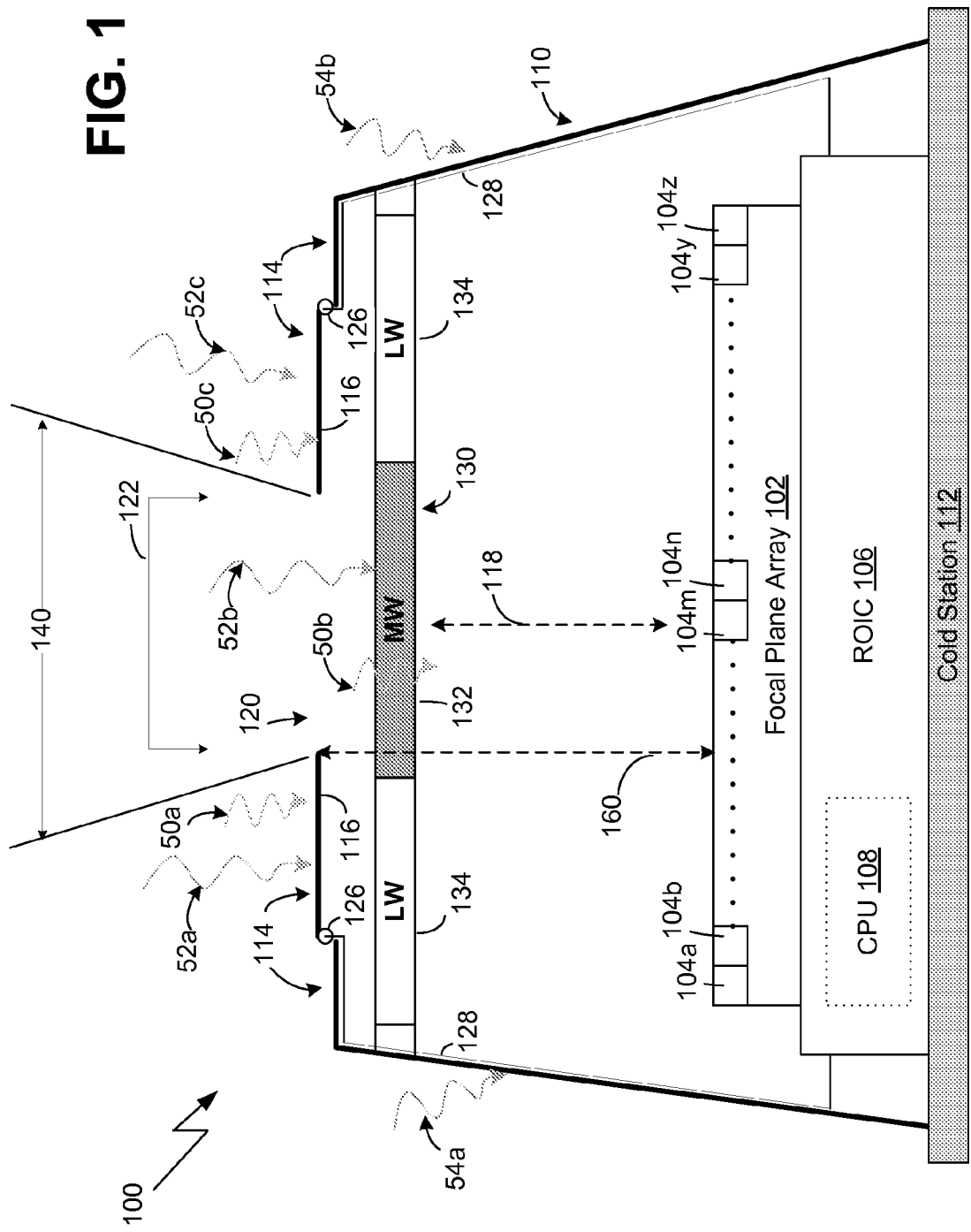
FIG. 1 is a block diagram of an exemplary image sensor consistent with the present invention, in which the image sensor has an aperture operatively configured to be switched between a first diameter and a second diameter.
Figure 2:
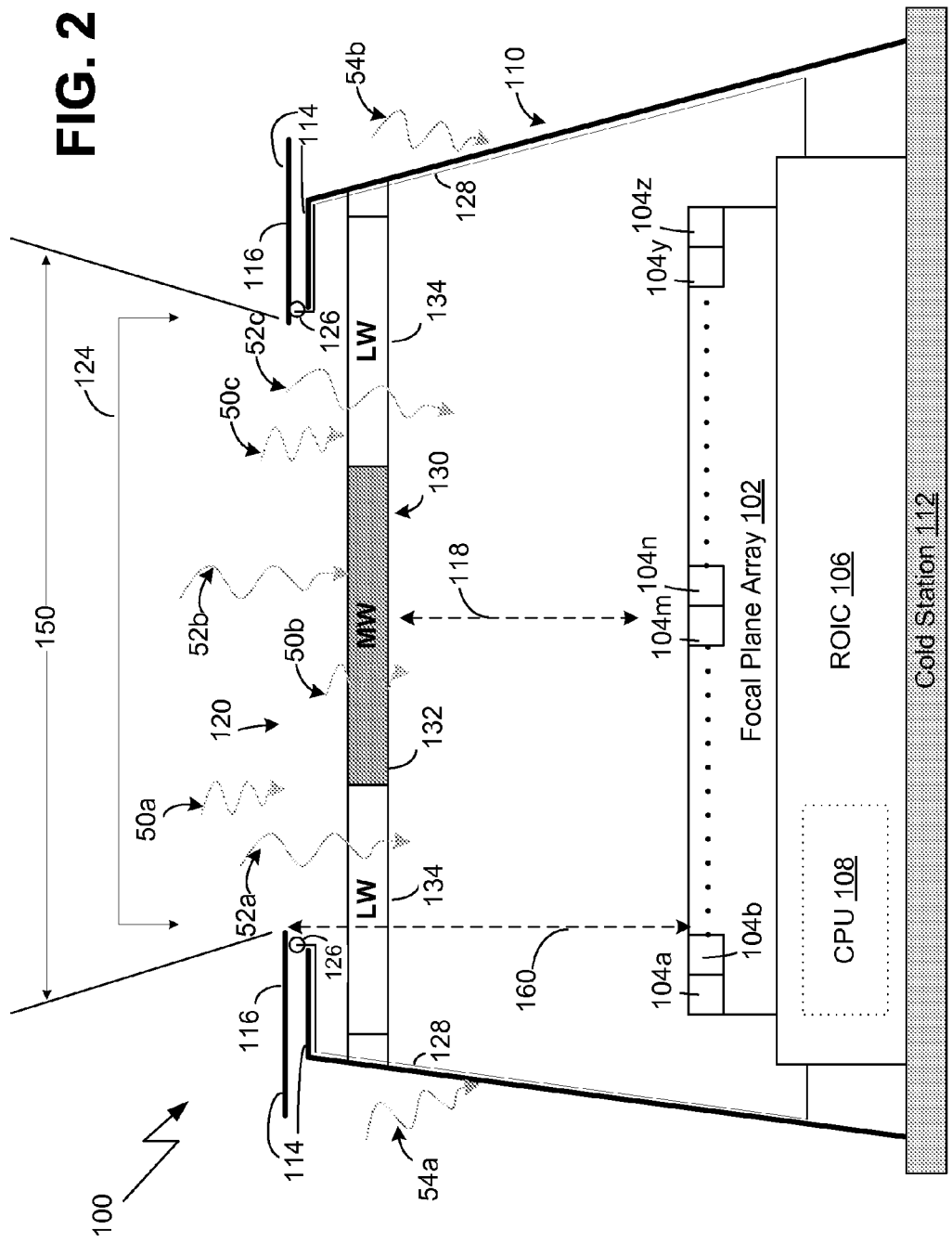
FIG. 2 is a block diagram of the exemplary image sensor in FIG. 1, where the aperture has been switched to the second diameter in accordance with the present invention.

FIGS. 1 and 2 depict an exemplary image sensor 100 consistent with the present invention. The image sensor 100 comprises a focal plane array 102 having a plurality of pixels 104a-104z and a readout integrated circuit ("ROIC") 106. The focal plane array 102 may be a mono-color focal plane array 102 in which each pixel 104a-104z is operatively configured to detect a radiation or light signal having a wavelength within the same predetermined band of wavelengths, such as a wavelength within the visible band (e.g., 400 nm-750 nm), near wavelength infrared band (e.g., 0.75-1.4 µm), short wavelength band, SWIR (e.g., 1.4-3 µm), MWIR band (e.g., 3 to 8 µm), or LWIR band (e.g., 8 to 14 µm). In one implementation, each pixel 104a-104z is operatively configured to detect a signal having a wavelength in a first band (e.g., light signal 52a or 52c) or in a second band having wavelengths shorter than the first band (e.g., light signal 50b). For example, the focal plane array 102 may be an LWIR focal plane array in which each pixel 104a-104z is operatively configured to detect a signal having a wavelength within either the LWIR band or the MWIR band, which has wavelengths shorter than the first band.

The ROIC 106 is operatively configured to readout a respective charge from a selected pixel 104a-104z that may have accumulated in each pixel as a result of detecting radiation or light signals within the first or second predetermined bands (e.g., signals 50b and/or 52a and 52c) as filtered by the image sensor 100. As discussed below, the ROIC 106 may include or be operatively connected to an external processor or CPU 108 programmed to selectively vary the diameter of an aperture of the image sensor 100 in accordance with the present invention. However, other components of the ROIC 106 (e.g., a vertical shift register and a horizontal shift register for selecting a pixel to readout) are not described in detail to add clarity and brevity to the description without obscuring the present invention.

The image sensor 100 also includes a cold shield 110 disposed over the focal plane array 102 and operatively configured to inhibit thermal radiation or light signals (e.g., light signals 54a and 54b) from reaching the focal plane array 102 except for light signals entering the image sensor 100 via two selectable optical field of views as described herein. The cold shield 110 may be operatively connected to or formed on a cold station 112, which may function as a heat exchanger for the cold shield 110 by cooling the cold shield 110, for example, via a liquid (e.g., water) or a gas (e.g., helium). The cold shield 110 has a top wall 114 disposed over the focal plane array. As shown in FIGS. 1 and 2, a portion 116 of the top wall 114 is operatively configured to be selectively moved in relation to a central axis 118 of the image sensor 100 or the focal plane array 102 so as to define an aperture 120 that may be switched between a first diameter 122 and a second diameter 124 that is larger than the first diameter 122. The portion 116 of the top wall 114 is selectively moved via a slide, track, or other mechanical or electrical conveyor mechanism 126 having an actuation input 128 controlled by the ROIC 106. In one implementation, the CPU 108 of the ROIC 106 or a CPU in a back-end processor (not shown in figures) operatively connected to the ROIC 106 may execute an operational program (not shown in figures) that causes the ROIC 106 to switch the aperture 120, via the actuation input 128, from the first diameter 122 to the second diameter 124 in accordance with one of a plurality of image capture conditions. For example, the image sensor 106 may be incorporated in a helmet mounted camera that may be employed in a smoky condition such as in a fire or battlefield, where detection of a target by a conventional MWIR detector may be inhibited. Accordingly, when in a smoky condition, the CPU 108 may prompt the ROIC 106 to switch from the first diameter 122 to the second diameter 124 so that LWIR signals (e.g., light signals 52a and 52c) may be selectively filtered through to and detected by one or more of the pixels 104a-104z.

As shown in FIG. 1, to allow selective filtering, the image sensor 100 includes a filter element 130 disposed between the cold shield aperture 120 (or the top wall 114 of the cold shield 110) and the focal plane array 102. The filter element 130 includes a first band-pass filter 132 and a second band-pass filter 134. The first band-pass filter 130 is disposed such that it is directly beneath the cold shield aperture 120 when the cold shield aperture 120 is switched to either the first diameter 122 or the second diameter 124. The second band-pass filter 134 is disposed such that it is covered by the portion 116 of the top wall 114 of the cold shield 110 when the cold shield aperture 120 is switched to the first diameter 120 and is directly beneath the cold shield aperture 120 when the cold shield aperture 120 is switched to the second diameter.

In the implementation shown in FIGS. 1 and 2, the first band-pass filter 132 is disposed in coaxial alignment with the cold shield aperture 120 relative to the central axis 118 of the image sensor 100 or the focal plane array 102. The second band-pass filter 134 is disposed adjacent to the first band-pass filter 132 relative to the central axis 118 of the image sensor 100 or the focal plane array 102. The first band-pass filter 132 and the second band-pass filter 134 may be concentrically aligned with the cold shield aperture 120 when switched to either the first diameter 122 or the second diameter 124. For example, in one implementation, the second band-pass filter 134 may be formed to surround the first band-pass filter 132. In this implementation, when the cold shield aperture 120 is switched from the first diameter 122 as shown in FIG. 1 to the larger second diameter 124 as shown in FIG. 2, the first band-pass filter 134 surrounding the second band-pass filter 132 is uncovered and directly beneath the cold shield aperture 120.

The first band-pass filter 132 is adapted to pass to the focal plane array 120 a first signal having a first wavelength within a first band of wavelengths (e.g., a light signal 50a, 50b, or 50c, where the first band of wavelengths is referenced as "50" in FIGS. 1 and 2). The second band-pass filter is adapted to pass to the focal plane array a second signal having a second wavelength within a second band of wavelengths (e.g., a light signal 52a, 52b, or 52c, where the second band of wavelengths is referenced as "52" in FIGS. 1 and 2). The second band of wavelengths 52 is different than and, preferably doesn't over lap with, the first band of wavelengths 50.

In the implementation shown in FIGS. 1 and 2, the first band-pass filter 132 is a MWIR band-pass filter and the second band-pass filter 134 is a LWIR band-pass filter. In this implementation, the second wavelength passed by the second band-pass filter is longer than each wavelength that may be passed by the first band-pass filter 132 to the focal plane array 102. In an alternate configuration, the first band-pass filter 132 may be a LWIR band-pass filter and the second band-pass filter 134 may be a MWIR band-pass filter. However, the filter element 130 is not limited to this implementation or configuration. The band-pass filters 132 and 134 may be configured to pass any two different bands in the frequency spectrum. For example, the first band-pass filter 132 may be a visible light band-pass filter and the second band-pass filter 134 may be a SWIR band-pass filter. In this implementation, each pixel 104a-104z is formed to have the same pitch or size to detect a signal having a wavelength within the SWIR band or the visible light band.

When the cold shield aperture 120 is switched to the first diameter 122, the image sensor 100 has a first field of view 140 corresponding to the first diameter 122 and the first band-pass filter 132. In the first field of view 140, a light signal 50b having a wavelength with the first band 50 is passed by the first band-pass filter 132 to pixels 140m and 140n beneath the cold shield aperture 120 and the first band-pass filter 132. Accordingly, when the first band-pass filter 132 is a MWIR filter, the image sensor 100 is operatively configured to have a narrower but longer range field of view 140 along the central axis 118 than if the first band-pass filter 132 was, for example, an LWIR filter.

When the cold shield aperture 120 is switched to the second diameter 122, the image sensor 100 has a wider second field of view 150 corresponding to the second diameter 124 as well as first band-pass filter 132 and the second band-pass filter 134. In the second field of view 150, a light signal 50b having a wavelength with the first band 50 is passed by the first band-pass filter 132 to pixels 104m and 104n disposed beneath the cold shield aperture 120 (at the first diameter 122) and the first band-pass filter 132. In addition, a light signal 52a or 52c is passed by the second band-pass filter 132 to pixels 104a, 104b, 104y, or 104z disposed beneath the cold shield aperture 120 (at the second diameter 124) and the second band-pass filter 134. Thus, the image sensor 100 may simultaneously receive and selectively process signals in two bands 50 and 52, which allows for search and target detection in a smoky condition.

The first diameter 122 and the second diameter 124 of the cold shield aperture 120 may be optimized for the focal length (f) associated with the filter element 130 or the respective bass-pass filter 132 and 134. In general, the cold shield aperture 120 has a higher f/# when switched to the first diameter 122 than when switched to the second diameter 124, where f/# corresponds to a height 160 from the focal plane array 102 to the cold shield aperture 120 divided by the respective cold shield aperture diameter 122 or 124. When the first band-pass filter 132 is an MWIR filter 132, the first diameter 122 of the cold shield aperture may be equal to or less than f/4. When the second band-pass filter 134 is an LWIR filter 132, the second diameter 124 of the cold shield aperture 120 may be equal to or greater than f/4, or preferably equal to or greater than f/2.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. An image sensor, comprising:
   a focal plane array;
   a cold shield having a top wall disposed over the focal plane array and defining an aperture operatively configured to be selectively switched between a first diameter and a second diameter that is larger than the first diameter; and
   a filter element disposed between the cold shield aperture and the focal plane array, the filter element including a first band-pass filter and a second band-pass filter,
   wherein the first band-pass filter has a diameter equal to or greater than the first diameter; the first band-pass filter being disposed in coaxial alignment with the cold shield aperture and directly beneath the cold shield aperture when the cold shield aperture is switched to the first diameter or the second diameter,
   wherein the second band-pass filter is covered by the top wall of the cold shield when the cold shield aperture is switched to the first diameter and is disposed directly beneath the cold shield aperture when the cold shield aperture is switched to the second diameter,
   wherein the first band-pass filter is adapted to pass to the focal plane array a first signal having a first wavelength within a first band of wavelengths and the second band-pass filter is adapted to pass to the focal plane array a second signal having a second wavelength within a second band of wavelengths, the second band of wavelengths being different than the first band of wavelengths, and
   wherein the focal plane array is a mono-color focal plane array having a plurality of pixels, each of which is adapted to detect the first signal passed by the first band-pass filter and the second signal passed by the second band-pass filter.

2. An image sensor according to claim 1, wherein the second wavelength in the second band is longer than each wavelength in the first band.

3. An image sensor according to claim 1, wherein the first band-pass filter is a medium wavelength infrared (MWIR) band-pass filter and the second band-pass filter is a long wavelength infrared (LWIR) band-pass filter.

4. An image sensor according to claim 1, wherein the focal plane array is a LWIR focal plane array.

5. An image sensor according to claim 1, wherein the second band-pass filter is adjacent to the first band-pass filter.

6. An image sensor according to claim 1, wherein the second band-pass filter surrounds the first band-pass filter.

7. An image sensor according to claim 1, wherein the first band-pass filter and the second band-pass filter are concentrically aligned with the cold shield aperture.

8. An image sensor according to claim 1, wherein the cold shield aperture has a higher f/# when switched to the first diameter than when switched to the second diameter, where f/# corresponds to a height from the focal plane array to the cold shield aperture divided by the respective cold shield aperture diameter.

9. An image sensor according to claim 1, wherein the first diameter of the cold shield aperture is equal to or less than f/4 and the second diameter of the cold shield aperture is greater than f/4, where f corresponds to a focal length of the filter element.

10. An image sensor according to claim 9, wherein the second diameter of the cold shield aperture is equal to or greater than f/2.

* * * * *